United States Patent
Harris

(10) Patent No.: US 9,376,027 B2
(45) Date of Patent: Jun. 28, 2016

(54) ROBOTIC MOWER INDUCTIVE CHARGING STATION

(71) Applicant: Deere & Company, Moline, IL (US)

(72) Inventor: Troy W Harris, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 35 days.

(21) Appl. No.: 14/026,411

(22) Filed: Sep. 13, 2013

(65) Prior Publication Data

US 2015/0077045 A1    Mar. 19, 2015

(51) Int. Cl.
| | |
|---|---|
| H02J 7/00 | (2006.01) |
| B60L 11/18 | (2006.01) |
| G05D 1/02 | (2006.01) |
| H02J 7/02 | (2016.01) |
| A01D 34/00 | (2006.01) |
| H02J 17/00 | (2006.01) |
| H02J 5/00 | (2016.01) |

(52) U.S. Cl.
CPC .............. B60L 11/182 (2013.01); A01D 34/008 (2013.01); G05D 1/0225 (2013.01); H02J 7/025 (2013.01); H02J 17/00 (2013.01); B60L 11/1829 (2013.01); H02J 5/005 (2013.01); H02J 50/10 (2016.02)

(58) Field of Classification Search
CPC ... B60L 11/182; B60L 11/1829; H01F 38/14; H02J 7/025
USPC ......... 320/108, 107, 103, 109, 114, 115, 134; 307/10.1
See application file for complete search history.

(56) References Cited

U.S. PATENT DOCUMENTS

| | | | |
|---|---|---|---|
| 5,787,545 A | 8/1998 | Colens | |
| 6,975,198 B2 * | 12/2005 | Baarman et al. | 336/192 |
| 2009/0183468 A1 * | 7/2009 | Gilder | 53/430 |
| 2009/0183478 A1 | 7/2009 | Bernini | |
| 2009/0289505 A1 * | 11/2009 | Baumann et al. | 307/104 |
| 2009/0315511 A1 | 12/2009 | Lai | |
| 2010/0225271 A1 * | 9/2010 | Oyobe | B60L 5/005 320/108 |
| 2011/0285349 A1 * | 11/2011 | Widmer | B60L 11/182 320/108 |
| 2012/0074891 A1 | 3/2012 | Anderson et al. | |
| 2012/0112534 A1 * | 5/2012 | Kesler | B60L 11/1812 307/10.1 |
| 2012/0187773 A1 * | 7/2012 | Wechlin et al. | 307/104 |
| 2012/0256585 A1 | 10/2012 | Partovi et al. | |
| 2012/0260617 A1 * | 10/2012 | Gilpatrick | A01D 34/001 56/11.9 |
| 2013/0093253 A1 * | 4/2013 | Norconk et al. | 307/104 |

FOREIGN PATENT DOCUMENTS

| | | |
|---|---|---|
| EP | 0744093 B1 | 11/1996 |
| EP | 1721279 B1 | 11/2006 |

(Continued)

OTHER PUBLICATIONS

European Search Report issued in counterpart application No. 14182780.8, dated Feb. 24, 2015 (8 pages).

(Continued)

Primary Examiner — Alexis A Boateng

(57) ABSTRACT

A robotic mower inductive charging station includes a plurality of transmitter coils mounted on a horizontal base structure in a pattern for inductive charging of a robotic mower that may enter and approach the charging station from any direction. The horizontal base structure may have a plurality of slots, perforations or holes covering at least about 50% of the base structure's surface area.

12 Claims, 5 Drawing Sheets

(56) References Cited

FOREIGN PATENT DOCUMENTS

| | | | |
|---|---|---|---|
| EP | 2082638 | A1 | 7/2009 |
| EP | 2256895 | A1 | 12/2010 |
| EP | 2475072 | A1 | 7/2012 |
| FR | 2974952 | A1 * | 11/2012 |
| KR | 100940189 | B1 | 2/2010 |
| WO | 2012045524 | A2 | 4/2012 |

OTHER PUBLICATIONS

Park, Changbyung et al. "Omni-directional Inductive Power Transfer System for Mobile Robots Using Evenly Displaced Multiple Pickups." Energy Conversion Congress and Exposition (ECCE), Sep. 15, 2012, pp. 2492-2497 [online] [retrieved on Apr. 2, 2015]. Retrieved from the Internet <URL: http://ieeexplore.ieee.org/stamp/stamp.jsp?arnumber=6342548> <DOI: 10.1109/ECCE.2012.6342548>.

* cited by examiner

ROBOTIC MOWER INDUCTIVE CHARGING STATION

FIELD OF THE INVENTION

This invention relates to robotic lawn mowers, and more specifically to a robotic mower inductive charging station.

BACKGROUND OF THE INVENTION

Robotic lawn mowers are typically powered by an onboard power source such as one or more batteries or a battery pack which supplies electrical power to both the traction drive and cutting unit. In general, robotic mowers will mow a plot of grass until exhausting the power source, then return home to a charging (or docking) station for recharging. For example, robotic mowers may have stainless steel and/or plated copper or brass electric contacts on their side or top surfaces, and that may be arranged to provide surface to surface contact or an insertion connection with the charging station.

When a robotic mower reaches a charging station, aligning the electric contacts may be difficult. The electric contacts require the robotic mower and charging station to be physically connected, either perpendicular or parallel to each other, with a small margin of error. Some of the factors preventing proper alignment of the contacts include navigational problems, contact corrosion, misalignment with the upright structure or ramp, wet conditions, etc. As a result, robotic mowers may not achieve a sufficient and necessary connection for charging. There is a need for a robotic mower charging station that reduces or eliminates the need for alignment of electric contacts, and allows robotic mowers to approach and be charged from any angle or orientation.

The form and appearance of the charging station also may be undesirable or unsightly, especially if the charging station is positioned in or near a plot of grass or yard where it is accessed frequently by the robotic mower. The charging station's ramp and upright structure may be so large in size that they cannot be hidden behind vegetation, shrubs or other landscape features. There is a need for a robotic mower charging station that is smaller in size and may be concealed from view.

SUMMARY OF THE INVENTION

A robotic mower inductive charging station includes a base structure having a plurality of transmitter coils mounted in a horizontal pattern. A robotic mower may find and enter the inductive charging station from any direction. The robotic mower may have a plurality of receiver coils mounted thereto in a horizontal pattern corresponding to the transmitter coils for inductively charging a battery pack on the robotic mower while the robotic mower is oriented on any axis. The inductive charging station also may have a plurality of openings through which grass may grow when the base structure is positioned on the ground.

DESCRIPTION OF THE PREFERRED EMBODIMENT

Figure 1:
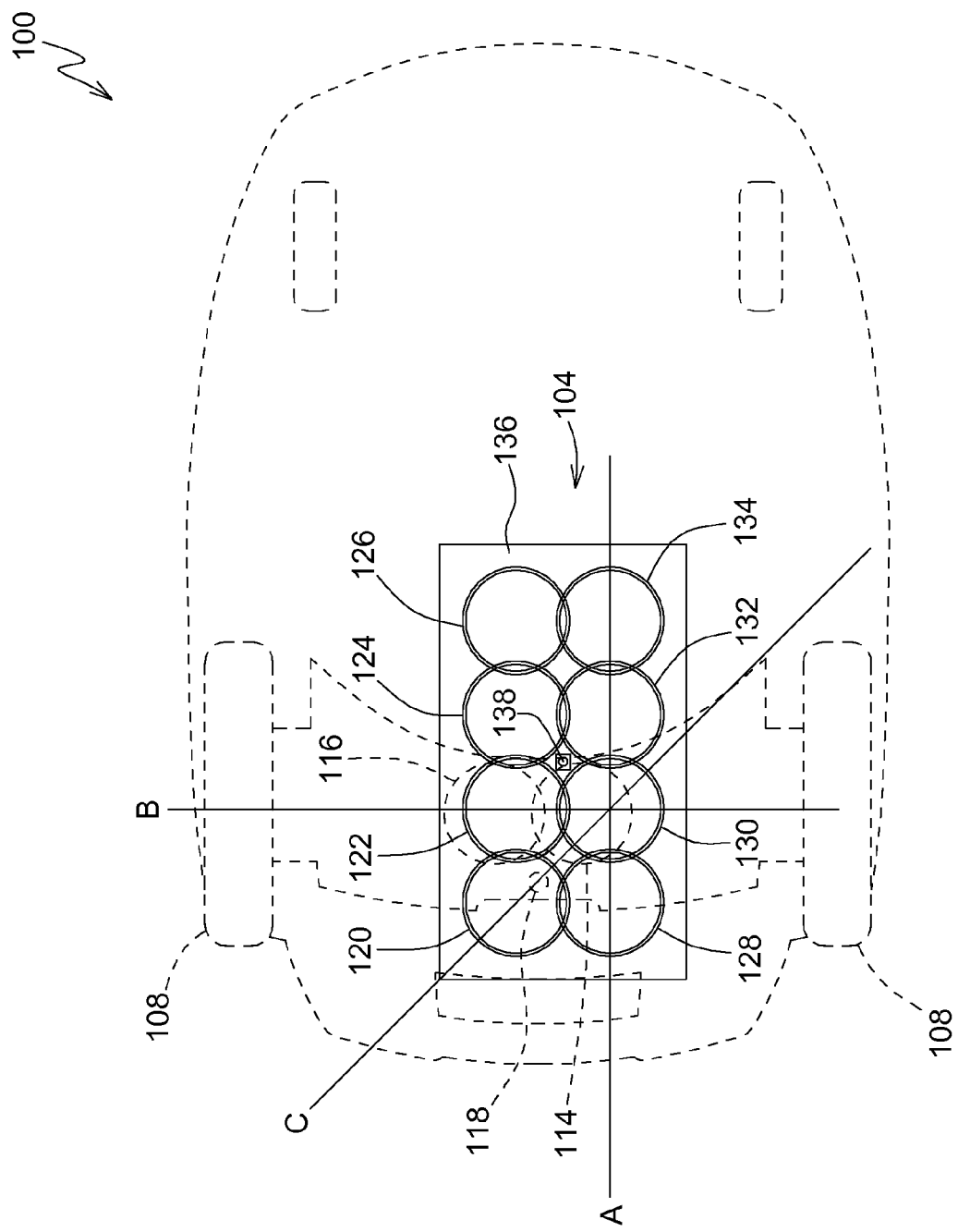
FIG. 1 is top view of a robotic mower and inductive charging station according to a preferred embodiment of the invention, with the robotic mower oriented on a first axis of the inductive charging station.
Figure 2:
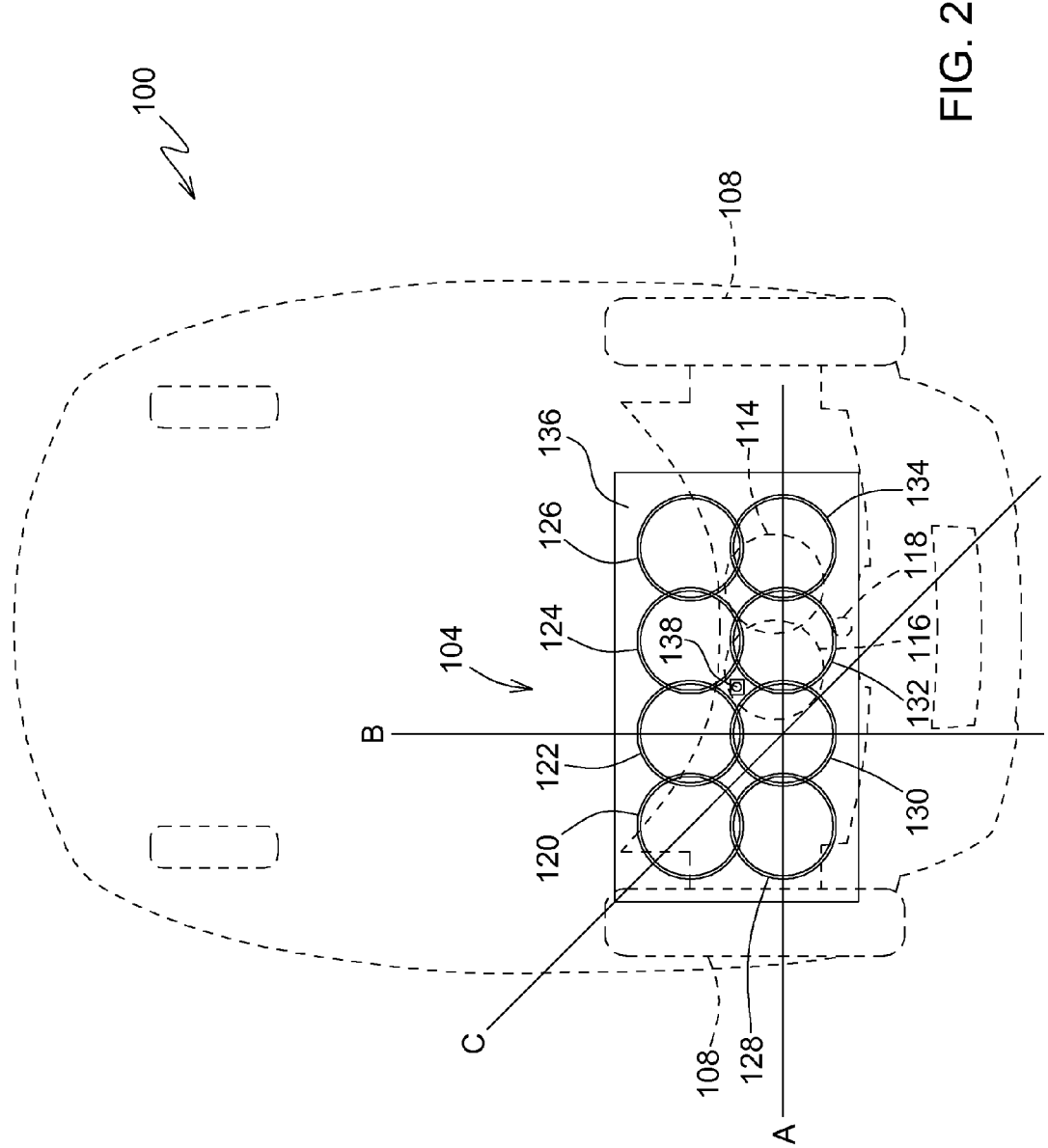
FIG. 2 is a top view of a robotic mower and inductive charging station according to a preferred embodiment of the invention, with the robotic mower oriented on a second axis of the inductive charging station.
Figure 3:
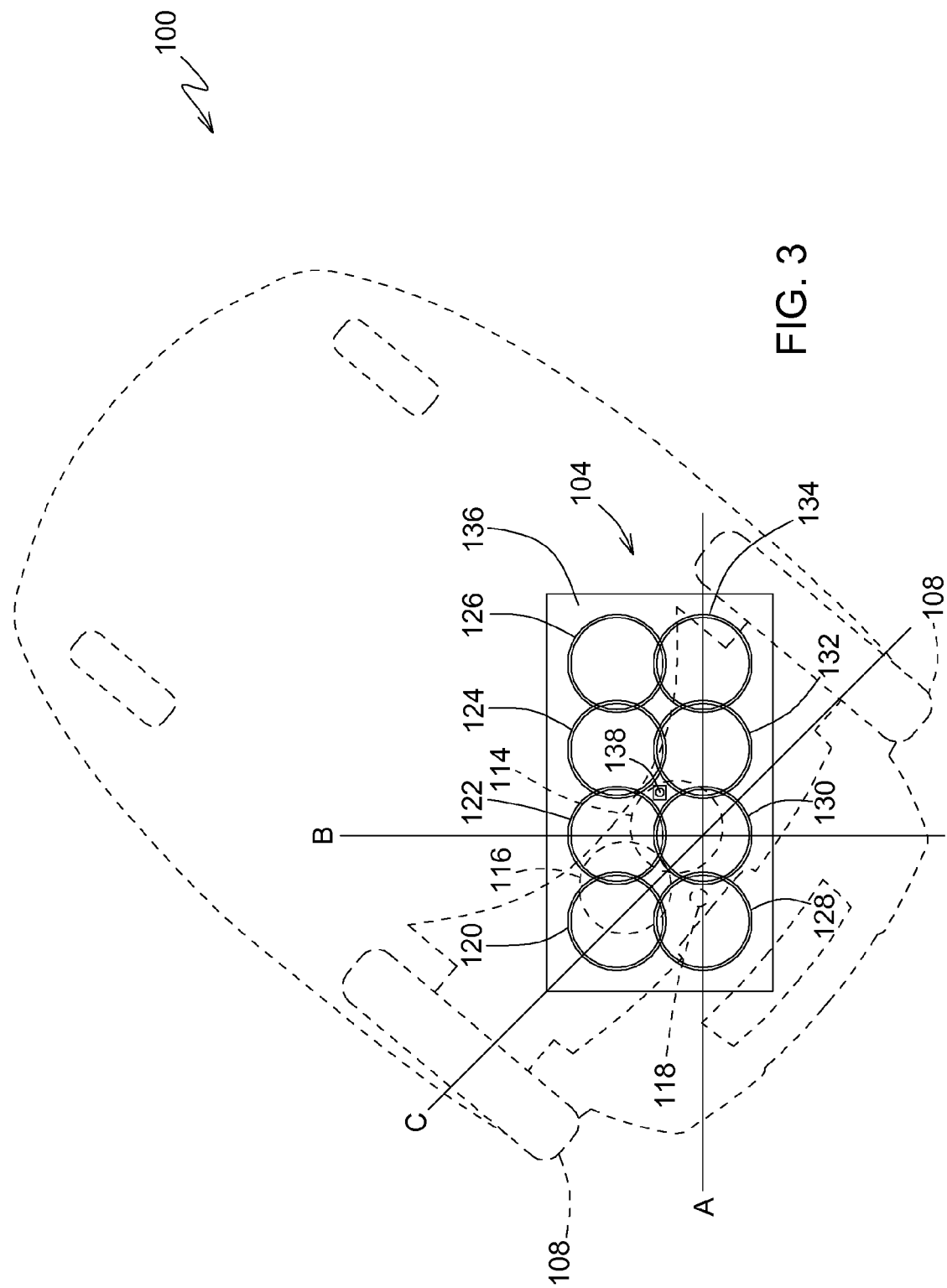
FIG. 3 is a top view of a robotic mower and inductive charging station according to a preferred embodiment of the invention, with the robotic mower oriented on a third axis of the inductive charging station.
Figure 4:
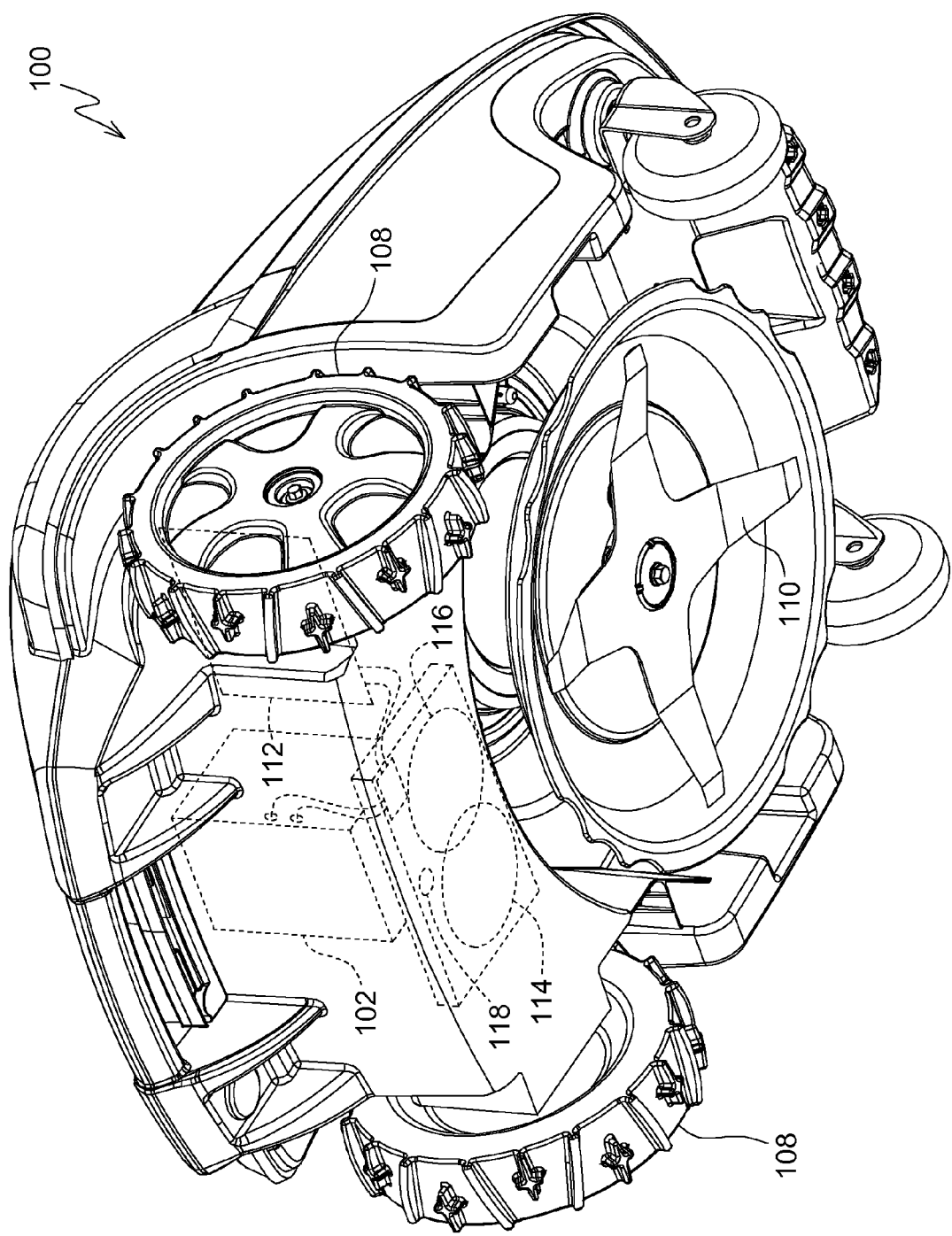
FIG. 4 is a bottom perspective view of a robotic mower for use with an inductive charging station and system according to a preferred embodiment of the invention.
Figure 5:
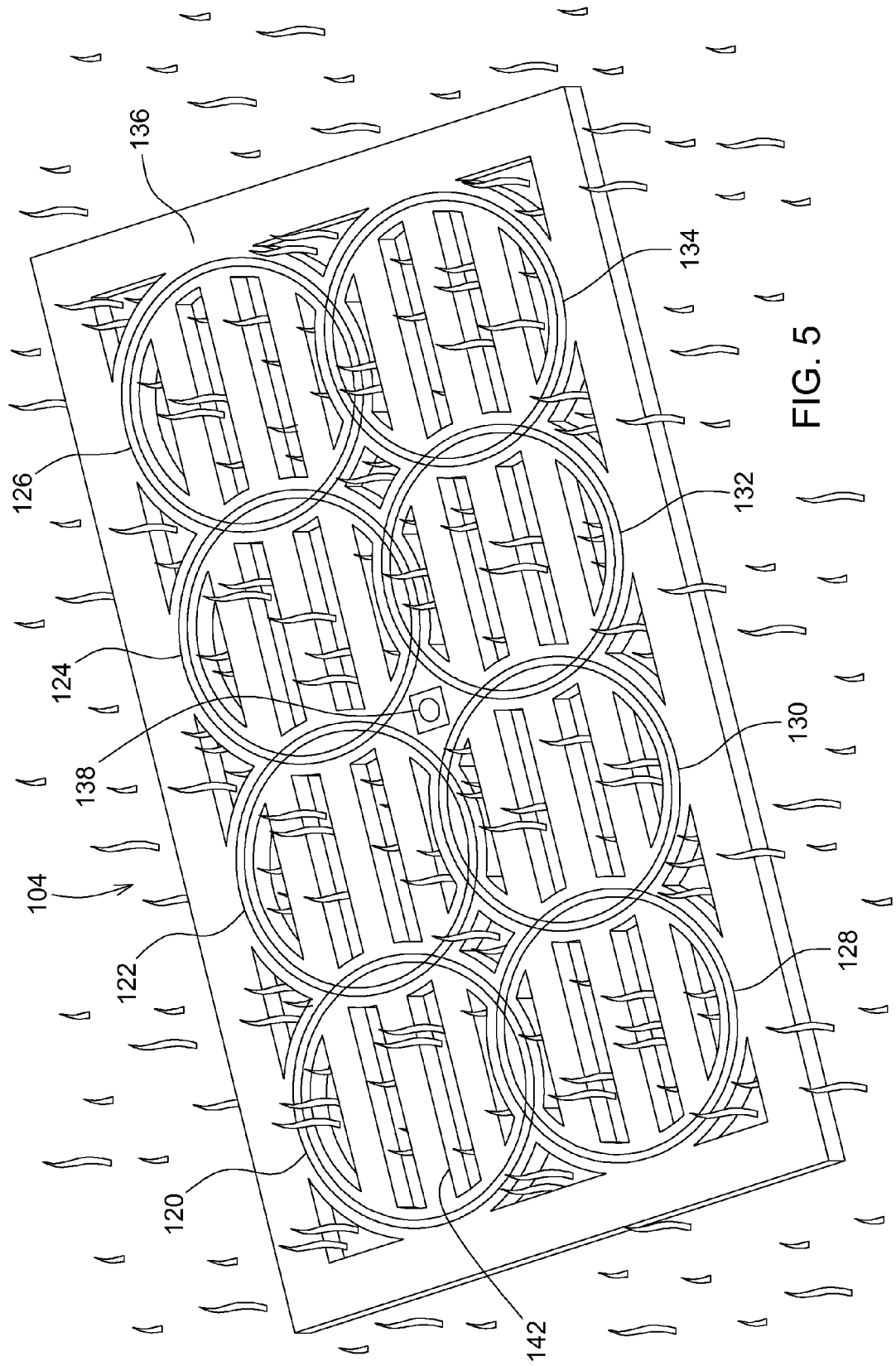
FIG. 5 is a top perspective view of a robotic mower inductive charging station according to a preferred embodiment of the invention.

In one embodiment shown in FIGS. 1-5, robotic mower 100 may be powered by battery pack 102 that may be charged periodically at inductive charging station 104. Battery pack 102 may store electrical energy used to operate a pair of variable speed electric motors 106 to turn a pair of traction drive wheels 108, rotate cutting blade 110, and power vehicle control unit 112 that may be programmed to command electric traction wheel motors 106 and operate functions of the robotic mower. Each traction wheel motor may be a DC brushed or DC brushless motor that controls one of the wheels.

In one embodiment, vehicle control unit 112 may be a printed circuit board assembly that serves as the main control board for the robotic mower. The vehicle control unit may interpret and process information from various sensors, and use that information to control and operate the pair of traction motors to drive the robotic mower over a yard in order to maintain the lawn, and to drive the blade motor. For example, the vehicle control unit may be connected to a number of sensors including one or more boundary sensors, as well as one or more obstacle sensors or accelerometers. The vehicle control unit also may communicate with the battery pack in order to monitor the status of the battery pack to maintain a charge for one or more lithium ion batteries in the battery pack. The vehicle control unit also may be connected to a user interface module including an LCD display along with several indicator lights and key buttons for operator input.

In one embodiment, robotic mower 100 may find, approach and enter inductive charging station 104 from a plurality of different directions or angles. After entering the inductive charging station, the vehicle control unit may command the electric traction wheel motors to stop so that battery pack 102 may be inductively charged while the robotic mower is at various different positions and orientations within the inductive charging station.

In one embodiment, the robotic mower may have at least one receiver coil and preferably at least two receiver coils 114, 116, mounted on horizontal lower surface 118 between traction drive wheels 108. The inductive charging station also may have at least one transmitter coil, and preferably more than two transmitter coils 120-134, mounted on horizontal base structure 136. The number of transmitter coils on the inductive charging station may exceed the number of receiver coils on the robotic mower. The transmitter coils may be mounted in a horizontal pattern having a first axis A, a second axis B that is perpendicular to the first axis, and at least one third axis C at an angle such as 45 degrees between the first axis and second axis. The robotic mower may be charged if the receiver coils are generally concentric, or oriented in close proximity and alignment, with at least one and preferably two of the transmitter coils about 1 inch to about 4 inches under the robotic mower.

In one embodiment, the inductive charging station also may include beacon 138 mounted to the base structure, which the robotic mower may use to find and approach the inductive charging station. The vehicle control unit may command the traction drive motors to drive the robotic mower toward the beacon when the vehicle control unit detects a low battery charge, completion of mowing or other tasks. The beacon may transmit signals and the robotic mower may have one or more sensors 140 that receive the signals. The sensors may be connected to vehicle control unit 112 which may command the robotic mower traction drive motors to drive the robotic mower to the beacon as signal strength increases in proximity to the beacon. However, if the vehicle control unit detects a decrease in signal strength from the beacon, it may command the traction drive motors to turn the robotic mower. Alternatively, the vehicle control unit may command the traction drive motors to drive the robotic mower along a boundary wire until reaching the inductive charging station. The vehicle control unit may command the electric traction wheel motors to stop when the beacon signal reaches a specified strength indicating that sensor(s) 140 on the robotic mower is within a required distance to the beacon for inductive charging to proceed. The required distance between the beacon and sensor is small enough to ensure that the receiver coils on the robotic mower will be about 1 to 4 inches above transmitter coils regardless of the orientation of the robotic mower on the inductive charging station.

In one embodiment, once the vehicle control unit commands the robotic mower to stop inside the inductive charging station, receiver coils 114, 116 may be concentric, and oriented in close proximity directly above two of transmitter coils 120-134 on any one of at least three different axes A, B or C. The vehicle control unit may energize the receiver coils, or provide another signal such as a magnetic or RFID signal, that may be picked up by the closest transmitter coils in the inductive charging station. The transmitter coils that charge the robotic mower batteries may depend on the robotic mower's position and orientation relative to the transmitter coils, and may be different as the robotic mower approaches and enters the inductive charging station from different directions. The inductive charging station may provide charging current to the transmitter coils that are in closest proximity under the receiver coils of the robotic mower. The robotic mower may be electromagnetically coupled to the inductive charging station so that maximum energy transfer may be achieved to battery pack 102. The robotic mower may remain in the inductive charging station until the charge cycle is complete.

In one embodiment, each receiver coil 114, 116 on the robotic mower may have a diameter of about 2 inches up to a maximum of about 6 inches. Each receiver coil may be a copper strip having a thickness of about ¼ inch up to about ½ inch. Each receiver coil may overlap the other receiver coil by about ¼ inch up to about 1 inch. The receiver coils may be coupled to a charging circuit for battery pack 102. The charging circuit for each coil may include a rectifier and may be connected through a switch to the battery pack.

In one embodiment, each transmitter coil 120-134 on the inductive charging station may have a diameter of about 2 inches up to a maximum of about 6 inches. The transmitter coils may be arranged on the base structure in any pattern provided that at least one of the transmitter coils, and preferably at least two transmitter coils, are underneath the receiver coils when the beacon-to-sensor signal strength indicates the robotic mower is within the required distance for charging. Each transmitter coil may be a copper strip having a thickness of about ¼ inch up to about ½ inch. Each transmitter coil may overlap at least two other transmitter coils by about ¼ inch up to about 1 inch. The transmitter coils may be coupled to a transmitter circuit, and the power draw may be about 100 Watts In one embodiment, the inductive charging station's horizontal base structure 136 may have a plurality of slots, perforations or holes 142. At least some of the slots, perforations or holes may be located within the diameter of each transmitter coil. Additionally, at least some of the slots, perforations or holes may be located between or outside the diameter of each transmitter coil. The slots, perforations or holes may cover at least about 50% of the base structure's surface area. The slots, perforations or holes may be dimensioned so that grass or similar vegetation may grow up through them while the base structure is on the ground. The grass or similar vegetation may help conceal the base structure from view within the mowed yard or area. Alternatively, the base structure may be formed of a mesh or screen material having a plurality of openings for grass or similar vegetation to grow up through the base structure.

Having described the preferred embodiment, it will become apparent that various modifications can be made without departing from the scope of the invention as defined in the accompanying claims.

The invention claimed is:

1. A robotic mower inductive charging station, comprising:
a horizontal base structure having a plurality of transmitter coils laying substantially flat on an unpaved ground surface for inductive charging a robotic mower, the transmitter coils mounted in a pattern on the horizontal base structure having a first axis, a second axis, and a third axis at an angle between the first axis and second axis for inductive charging of a robotic mower entering the charging station over the transmitter coils along any of the first, second or third axes; and
a plurality of slots, perforations or holes covering at least about 50% of the base structure's surface area to permit vegetation growth through the slots, perforations or holes.

2. The robotic mower inductive charging station of claim 1 wherein the second axis is perpendicular to the first axis.

3. The robotic mower inductive charging station of claim 1 further comprising a beacon transmitting signals to a robotic mower for finding the inductive charging station.

4. The robotic mower inductive charging station of claim 1 wherein the slots, perforations or holes are within a diameter of each transmitter coil.

5. The robotic mower inductive charging station of claim 1 wherein the base structure is a mesh material.

6. A robotic mower inductive charging station, comprising:
a plurality of transmitter coils arranged on a substantially flat portion of a base structure on an unpaved ground surface for charging a robotic mower when the robotic mower drives over the transmitter coils from any of a plurality of different directions and orientations; and
a plurality of openings both inside and outside the transmitter coils where grass may grow through the substantially flat portion of the base structure.

7. The robotic mower inductive charging station of claim 6 wherein the plurality of openings exceed 50% of the surface area of the base structure.

8. The robotic mower inductive charging station of claim 6 wherein the plurality of transmitter coils are aligned on a first axis, a second axis that is perpendicular to the first axis, and at least one third axis that is at between the first axis and the second axis.

9. The robotic mower inductive charging station of claim 6 further comprising a homing beacon on the base structure.

10. A robotic mower inductive charging system, comprising:
- a base structure having a substantially flat portion for charging a robotic mower using a plurality of transmitter coils mounted in a pattern thereon; holes through the base structure sufficient for vegetation growth; and
- the robotic mower having a plurality of receiver coils mounted thereto in a pattern matching the transmitter coils for inductively charging a battery pack on the robotic mower while the robotic mower is positioned in any of a plurality of different orientations over the substantially flat portion of the base structure.

11. The robotic mower inductive charging system of claim 10 further comprising a beacon on the base structure transmitting signals to the robotic mower to find the base structure.

12. The robotic mower inductive charging system of claim 10 wherein the robotic mower has two receiver coils.

* * * * *